Dec. 25, 1962  E. H. SCHULTZ, JR  3,069,919
STEPPED PULLEY
Filed Oct. 18, 1960
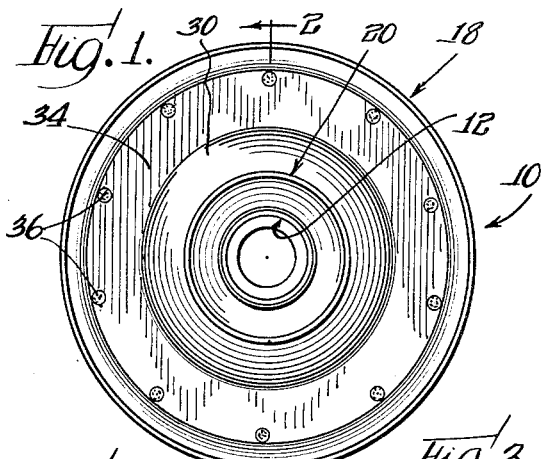
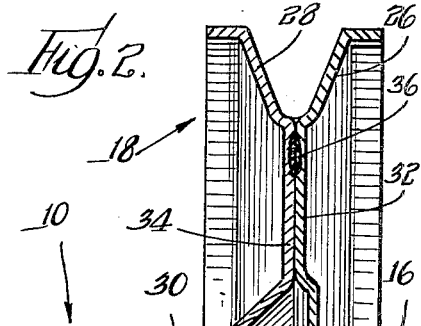
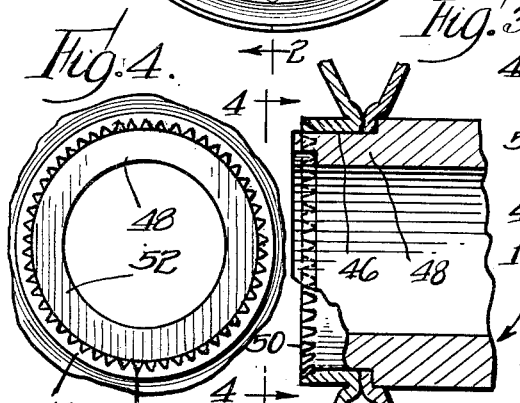
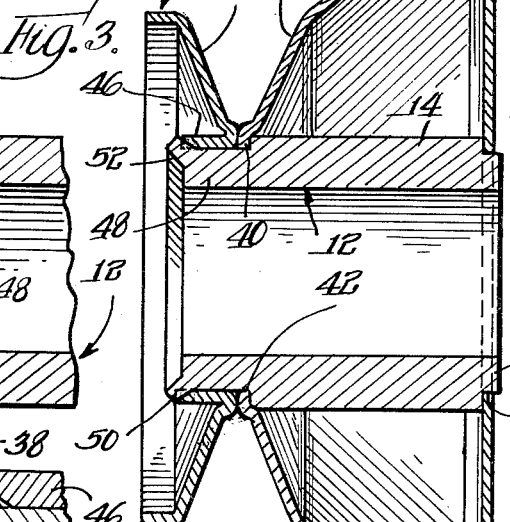
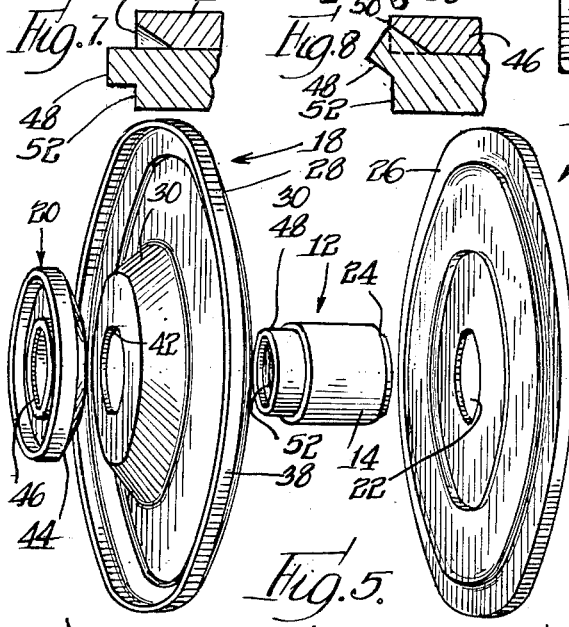
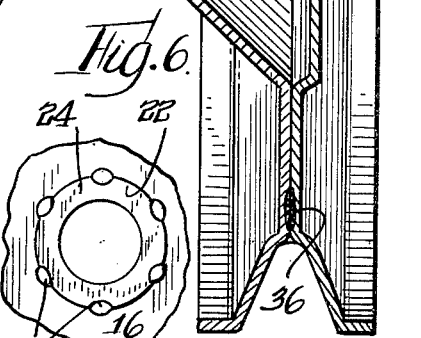
INVENTOR.
Edward H. Schultz, Jr.
BY
Olson & Trexler
attys.

United States Patent Office 3,069,919
Patented Dec. 25, 1962

3,069,919
STEPPED PULLEY
Edward H. Schultz, Jr., Chicago, Ill., assignor to The Nagel-Chase Manufacturing Company, Chicago, Ill., a corporation of Illinois
Filed Oct. 18, 1960, Ser. No. 63,373
5 Claims. (Cl. 74—230.8)

This invention relates to stepped pulleys.

Stepped pulleys comprising different diameter sheaves fixed together have been known and used for many years; and modernly, such stepped pulleys incorporate sheave-defining members fashioned from sheet materials such as sheet metal. Numerous methods for securing the sheet material parts to the cooperating hub element have been devised; and various difficulties have arisen in connection with the several prior art constructions. Among the more commonly encountered problems are numbered complete failure of the joint between the largest diameter pulley and the hub, partial failure of this joint and concomitant wobble or run-out, and the high cost of known methods of fastening the small diameter pulley to the hub element.

It is, therefore, a general object of the present invention to provide an improved, stepped pulley.

Another object of the invention is to provide a stepped pulley in which the largest diameter pulley is securely mounted to the hub.

Yet another object of the invention is to provide a stepped pulley in which the small diameter pulley is both efficiently and economically secured to the hub.

Additional objects and features of the invention pertain to the particular structure and arrangements whereby the above objects are attained.

A structure in accord with the invention includes a first sheet material member defining adjacent its periphery one side of the groove of a relatively large diameter pulley; a second sheet material member secured to the first member defining the other side of the groove, the second member further defining one side of the groove of a relatively smaller diameter pulley coaxial with and axially spaced-apart from the relatively large diameter pulley; a third sheet material member arranged to define the other side of the smaller diameter pulley groove, the third member including an axially extending sleeve portion having a serrated edge away from the second member; and a hub element received in the sleeve and non-rotatably secured to the first sheet material member, the hub element having an end portion formed over the serrated edge of the third sheet material member, the formed over end portion meshing with the serrations of the serrated edge of the sleeve to secure the third sheet material member non-rotatably to the hub element.

In order that the principle of the invention may be readily understood, a single embodiment thereof applied to a two-step pulley but to which the application is not to be restricted, is shown in the accompanying drawing wherein:

FIG. 1 is an end view of a stepped pulley constructed in accordance with the invention, the view being taken from the small diameter pulley end of the unit;

FIG. 2 is an enlarged view taken through the section 2—2 of FIG. 1;

FIG. 3 is a fragmentary, cross-sectional view of the small diameter pulley end of the unit illustrating the arrangement of the parts before the end of the hub element is formed over;

FIG. 4 is a view taken through the section 4—4 of FIG. 3;

FIG. 5 is an exploded perspective view of the stepped pulley of the invention;

FIG. 6 is a reduced scale view taken through the section 6—6 of FIG. 2;

FIG. 7 is a fragmentary, cross-sectional view of the third sheet material member assembled to the hub element, showing particularly the serrated edges before the end of the hub is formed over; and FIG. 8 is a view similar to that of FIG. 7 but showing the parts after the end of the hub has been formed over.

Referring now in detail to the drawing, specifically to FIGS. 1 and 2, a stepped pulley indicated generally by the numeral 10 will be seen to include a hollow cylindrical hub element 12 having a radially enlarged central portion 14. Three sheet material members, members 16, 18 and 20, are mounted on hub element 12 forming a relatively large diameter pulley and a relatively smaller diameter pulley. The sheet material for members 16, 18 and 20 is preferably a sheet metal, such as sheet steel.

The member 16 has a central aperture 22 which is adapted to receive an end portion 24 of hub element 12. Member 16 also includes an annular, angulated wall portion 26 adjacent its periphery, the wall portion 26 defining one side of the groove of the relatively large diameter pulley. The member 18 includes a corresponding and oppositely angulated, annular wall portion 28 which defines the other side of the large diameter pulley groove. Radially inwardly from the portion 28, member 18 includes a frusto-conical wall portion 30 which extends in a direction generally away from the member 16. The members 16 and 18 are joined together at cooperating wall portions 32 and 34 respectively, employing weldments 36 or other suitable means.

The member 18 additionally includes an angulated wall portion 38 and a collar portion 40, wall portion 38 defining one side of the groove of the relatively smaller diameter pulley and the collar portion 40 defining a central aperture 42 which is coaxial with and spaced-apart from the aperture 22 of member 16. It will be noted that the radially enlarged portion 14 of hub element 12 is generally confined between the collar portion 42 and the rim of aperture 22. Moreover, it is to be recognized that both the large and the small diameter pulley grooves are adapted to receive V-belts and similar power transmitting elements.

The member 20 includes an angulated wall portion 44 which is arranged to define the other side of the smaller diameter pulley groove. The member 20 also includes an axially extending, cylindrical sleeve portion 46, sleeve portion 46 cooperating with the collar portion 42 of member 18 in receiving an end portion 48 of hub element 12.

As is best shown in FIGS. 3 and 4, sleeve portion 46 terminates in a serrated edge 50 which faces generally away from member 18; and in accordance with a feature of the invention, the terminal edge of end portion 48 is formed over the serrated edge 50 as by spinning or swaging. Advantageously, the serrated edge 50 is provided with a conical taper and the end portion 48 is axially hollowed at 52 to facilitate this forming.

In assembly of the stepped pulley 10, the members 16 and 18 are coupled to hub element 12 with end portions 24 and 48 received respectively in the apertures 22 and 42. Thereafter, members 16 and 18 are affixed together by means of the weldments 36; and since it is desirable to establish a non-rotatable relationship between hub element 12 and the sheet material member 16, the end portion 24 is peened over at a number of arcuately spaced locations 54 as shown in FIG. 6. This peening operation tends to form the rim of aperture 22 as well as the edge of end portion 24 whereby hub 12 is effectively keyed to the member 16.

Next, the sheet material member 20 is assembled to hub element 12 with the collar portion 46 receiving the end portion of the hub element. Subsequently, the edge of hub element 12 about the hollowed section 52 is formed over as hereinabove described; and as the metal of the hub element is urged radially outward and over the serrated edge 52, the material of the hub element is pressed into the serrations forming an element meshing therewith whereby to key the member 20 to the hub element 12. Hub element 12 is otherwise free in sleeve 46.

Concomitantly with the creation of portions of the hub element 12 meshing with the serrated edge 50, the sleeve portion 46 is urged in the general direction of member 16 and the collar portion 40 of member 18 is pressurally abutted and forced against the adjacent shoulder established by the enlarged portion 14 of hub element 12 and the edge of the sleeve portion 46 is urged into tight abutting relationship with the member 18 at the apex of the small diameter pulley.

From the foregoing description, it will become apparent that the present invention provides a stepped pulley in which the large diameter pulley is securely mounted to the hub element and wherein the small diameter pulley is affixed to the hub element in an efficient and economical manner. Such a pulley has, as will be recognized, manifest utility as a speed reducing pulley. Accordingly, the specific example herein shown and described should be considered as illustrative only. Various changes in structure may occur to those skilled in the art; and such changes are to be understood as forming a part of this invention insofar as they fall within the true spirit and scope of the appended claims.

The invention is claimed as follows:

1. A stepped pulley comprising a first sheet material member defining adjacent its periphery one side of the groove of a relatively large diameter pulley, a second sheet material member secured to said first member and defining the other side of said groove and further defining adjacent its inner periphery one side of the groove of a relatively small diameter pulley axially spaced from said relatively large diameter pulley, a third sheet material member abutting said second member and defining the other side of the small diameter pulley groove and including a sleeve portion projecting axially away from said second member and having the free edge thereof provided with multiple serrations therearound, and a substantially tubular hub element on which said members are mounted and having the edge of its end portion adjacent said serrations directed radially outwardly and axially into the serrations on said sleeve portion and thereby into forced interfitting relationship therewith for fixing said third member to the hub and in tight abutting relationship with said second member at the apex of the small diameter pulley groove.

2. A stepped pulley as claimed in claim 1, wherein the hub element includes a radially enlarged portion intermediate the first and second members defining shoulders against which the adjacent portions of said first and second members abut.

3. A stepped pulley as claimed in claim 1, wherein the said end portion of the hub member is counter-bored to facilitate interfitting thereof with said serrations.

4. A stepped pulley as claimed in claim 1, wherein the inner peripheral edge of the serrations has a conical taper.

5. A stepped pulley as claimed in claim 1, wherein the opposite end of said hub element is peened over said first member to key the same to the hub element.

References Cited in the file of this patent

UNITED STATES PATENTS

| | | |
|---|---|---|
| 1,090,505 | Sparks | Mar. 17, 1914 |
| 2,257,684 | Hecht | Sept. 30, 1941 |
| 2,318,950 | Larmour | May 11, 1943 |
| 2,738,681 | Schultz | Mar. 20, 1956 |